June 5, 1951 R. A. GREEN 2,555,334
HYDRAULIC SURGE-INHIBITOR VALVE
Filed May 6, 1949
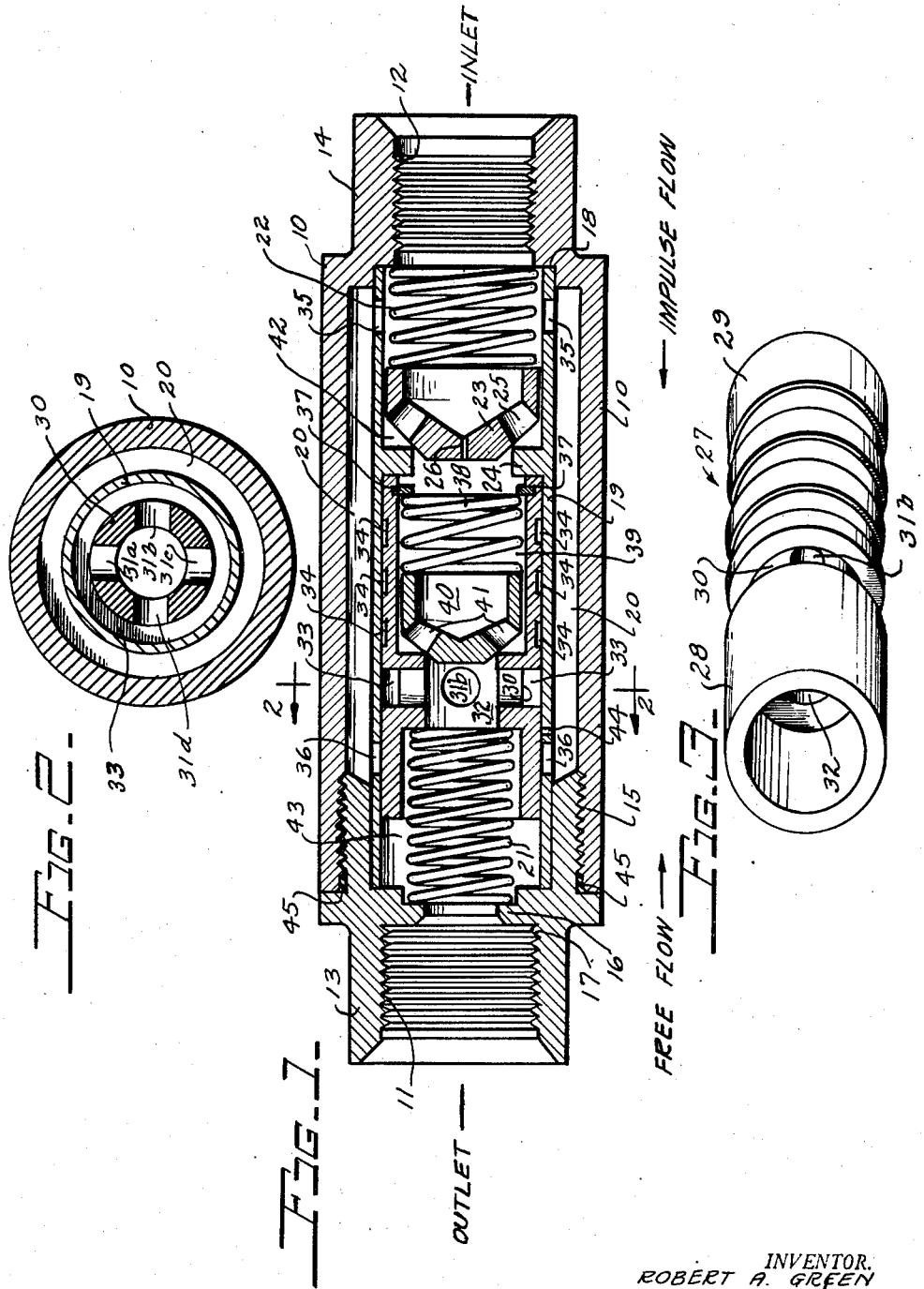
INVENTOR.
ROBERT A. GREEN
BY Wade Koontz AND
Chester Tietz
ATTORNEYS Patented June 5, 1951

2,555,334

UNITED STATES PATENT OFFICE 2,555,334

HYDRAULIC SURGE-INHIBITOR VALVE

Robert A. Green, Dayton, Ohio

Application May 6, 1949, Serial No. 91,853

4 Claims. (Cl. 137—153)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to a hydraulic surge-inhibitor valve for preventing the destructive or undesirable effects of hydraulic surge pressures. One object of the invention is to provide a valve which is versatile in respect to installation; it can be used under a wide variety of conditions.

Another object is to provide a valve which is easily produced by normal manufacturing methods and practices.

Another object is to provide a valve which is small in size, light in weight and of simple and rugged design.

Another object is to provide a valve in which various degrees of surge damping can be obtained from one basic valve merely by varying the orifice size in the valve.

Another object is to provide a valve in which the operating portion thereof can be made an integral part of some other hydraulic system component, for example a directional control valve, or unloader valve.

Another object is to provide a valve which will not produce undesirable restriction to normal fluid flow.

While the valve which is the subject of my invention is capable of general use, it is especially adapted for aircraft use. In the past the necessity of using long lengths of tubing and quick opening control valves, such as solenoid or pilot-operated valves in the hydraulic system of modern aircraft, particularly large airplanes, resulted in the occurrence of peak pressure surges of destructive magnitudes. The subject of the invention is, in effect, a momentary restrictor valve, which is capable of damping out these surges and then allowing free flow through the valve.

In the drawings:

Fig. 1 is a longitudinal section through the valve.

Fig. 2 is a cross-section taken on the line 2—2 of Fig. 1.

Fig. 3 is a perspective view of the spool and its guides.

Referring now to the drawings particularly Fig. 1 thereof, the valve comprises a housing or body 10 of cylindrical character having threaded ends in 11 and 12 for line connections. The threaded ends are contained within shoulders cylindrical portions at 13 and 14. These may be also made with polygonal exterior surfaces to adapt them to be held by wrenches. Fitting 14 which is at that end of the valve from which the impulse flow enters, is made preferably integral with the valve body 10. Fitting 13 which is located at that end of the valve body from which free flow enters, is threadedly engaged into the interior of the valve body 10 by a threaded joint 15. Within the portion 13 there is a shoulder 16 on the inner end of a somewhat restricted bore 17.

In Fig. 1, between the left-hand internal shoulder 16 and a right-hand internal shoulder 18 there is rigidly positioned a sleeve 19 of substantially smaller diameter than the bore of the housing 10. Consequently an annular passage 20 is left between the sleeve 19 and the housing 10.

The parts which operate within the sleeve 19 are retained in operating position, i. e. pushed toward each other by coil springs 21 and 22, shown left and right respectively in Fig. 1. Spring 21 is preferably of smaller diameter and is longer than spring 22. Spring 22 controls an orifice check valve 23 which is normally forced by spring-pressure against internal shoulder 24 of the sleeve 19. The orifice check valve 23 has a plurality of large ports 25 which are sealed by spring pressure from communication with that part of the sleeve which lies to the left of the shoulder 24. A small orifice 26 is however provided in a central location so that it is always in communication with the interior of the sleeve 19 to the left of shoulder 24.

Between the shoulder 24 and within the sleeve 19, there is a spool 27, which is shown in perspective separately in Fig. 3. The spool comprises a left-hand smooth, cylindrical portion 28, which is hollow for the accommodation of the spring 21, and a grooved hollow cylindrical portion 29. The two portions are joined by an integral neck 30 in which there are four ports 31a, 31b, 31c and 31d (see Fig. 2). A different number of ports could be employed. The neck 30 is hollow, 32 being the passage therethrough and 33 being the annular passage between the neck 30 and the sleeve 19. A plurality of grooves 34 on the spool portion 29 may accommodate seal rings (not shown). If seal rings are not used, the grooves 34 may serve as pressure equalizing means to prevent side loading of spool 27 due to eccentric leakage paths between the close fitting spool 27 and the sleeve 19.

The sleeve 19 is provided with a plurality of radially equidistant ports 35 which in Fig. 1 are to the right of the orifice check valve 23. A corresponding set of ports 36 is provided in the sleeve 19 where they are covered by the spool portion 28 when the valve is not transmitting impulse flow. Some very small holes 44 are located to the right of ports 36.

Within the hollow portion 29 of the spool 27 there is a chamber 39, in which there is a stop ring 37 against which a coil spring 38 abuts. The spring 38 presses a check valve 40 similar in form to check valve 23 against the spool neck 32, thereby closing the latter. The check valve 40 has angularly disposed ports 41. The check valve 40, the spring 38 and the spool portion 29 occupy a chamber 39. Chamber 43 is the space occupied by the spring 21 and bounded by spool portion 28 and sleeve 19. Chamber 42 is the space occupied by the orifice check valve 23 and the spring 22.

Operation

In operation, liquid under pressure flows into the valve through the inlet port, i. e. that end having the threads 12. The pressure is transmitted through the ports 35 in the sleeve 19 into the passage 20 which extends around the sleeve. A negligible amount of leakage occurs around the spool surface 28. The inlet pressure forces liquid through the orifice 26 of the orifice check valve 23 into the chamber 39, where it slowly displaces the spool 27 toward the outlet port. The motion of the spool 27 causes the ports 36 to be gradually uncovered by the annular passage 33, thus allowing liquid from the passage 20 to flow gently through the ports 36 into the space 33 then gently through the spool ports 31a, 31b, 31c and 31d through the interior 32 of the spool neck 30 and into chamber 43 thence through the outlet constriction 17 and past the threads 11 and out of the fitting 13. If extremely fine metering is required, one or more very fine holes 44 may be drilled through the sleeve 19 to obtain such effect. These holes 44 would then be used supplementally to the ports 36.

As soon as the flow of fluid through the valve has stopped, the spring 21, which was compressed during the leftward motion of the spool 27 will return the latter to its original position abutting the shoulder 24, where it will be in position to inhibit the next pressure surge. During the return stroke of the spool 27, the liquid which was trapped in the chamber 39 will leak out between the spool 27, the sleeve 19 and through the orifice check valve 23. Reverse flow will readily pass through this valve by displacing the check valves 40 and 23 from their seats against the pressure of springs 38 and 22 respectively. If reverse flow through the valve is not required by the installation, the check valve 40, its seat in the spool 27 and its spring 38 may be omitted and the spool correspondingly shortened.

External leakage is prevented by a static seal 45 which comprises a soft gasket contained in a gland between the body 10 and the fitting 13. The degree of damping obtainable from the valve can be varied by changing the relationship between the volume of the chamber 39 and the size of the orifice 26. The larger the chamber 39 in relation to the orifice size, the greater will be the degree of damping.

I claim:

1. In combination in a surge inhibiting valve a body having inlet and outlet openings, means within said body to define a by-pass passage extending substantially the full length of the body, an orifice type first check valve at the inlet side of said means and located within it for routing surging pressure liquid through said by-pass passage, a substantially hollow spool laterally movable within the passage-defining means, a second check valve, said check valve being located within said spool, both the spool and the passage-defining means having transverse ports registrable when said spool is displaced by leakage from said orifice type first check valve to route the liquid from the by-pass passage into the spool and thence out the outlet passage of said body, said first check valve being spring pressed lightly to permit its being lifted by reverse flow at moderate pressure to provide substantially free reverse flow through the valve.

2. The combination recited in claim 1 wherein the check valve within the spool is spring pressed to close the entrance to the neck of the spool from the inlet side of the valve, the degree of spring pressure being such that the neck entrance will be easily opened by the moderate pressure of liquid flowing from the outlet end of the valve toward the inlet end of the valve, and the registration of the transverse ports will be disturbed.

3. In a surge inhibitor valve, a generally cylindrical body, an outlet fitting for said body, internal shoulders defined by said body and said fitting, a sleeve positioned within said body between said shoulders and spaced from said body to define an annular passage, said sleeve having ports adjacent said shoulders, an internal shoulder within said sleeve, a spring pressed orifice check valve adapted to form a leaking seal with said sleeve internal shoulder and when moved by reverse flow to cover the ports to which it is adjacent, a necked hollow spool closely fitting and internally slidable in said sleeve between said sleeve internal shoulder and said fitting internal shoulder, a spring normally urging said spool into contact with said sleeve internal shoulder, a spring pressed check valve normally interiorly closing off the neck of the spool, the said neck having ports adapted to be placed in communication with the sleeve ports adjacent the outlet fitting upon full longitudinal displacement of said spool until engagement with said fitting shoulder takes place.

4. In a hydraulic surge-inhibitor valve a cylindrical body of two diameters, the larger thereof being positioned between two threaded ends of the smaller diameter, an internal sleeve of an internal diameter larger than the end internal diameter and smaller than the middle internal diameter of said body, and from inlet end to outlet end, a circular shoulder defining a chamber having a port, a check valve having large normally closed ports and a metered central leakage abutting said shoulder, a coil spring normally gently urging said check valve against said shoulder, said valve being able, upon being forced back, to compress said coil spring, and to open unrestricted flow through said valve via the ports thereof, a second chamber beyond said shoulder, a spool slidable in said chamber, a hollow neck in said spool, said neck having four crosswise-disposed ports, a spring-pressed check valve closing the entrance to said hollow neck and one internal entrance to said ports, a coil spring abutting the outer end of said neck, an outer spool chamber defined by a solid wall, said chamber enclosing a substantial proportion of said spring, said sleeve having a pair of ports normally sealed by the said solid chamber wall but registrable with the crosswise-disposed ports in said neck when said spool is shifted by impulse flow to abut a shoulder formed by the junction of said smaller diameter part of the body which constitutes the outlet end thereof with the larger-diameter part of said body.

ROBERT A. GREEN.

REFERENCES CITED

The following references are of record in the file of this patent:

UNITED STATES PATENTS

| Number | Name | Date |
|---|---|---|
| 1,153,770 | Daymon | Sept. 14, 1915 |
| 1,933,454 | Sidney | Oct. 31, 1933 |
| 2,005,813 | Thorsen | June 25, 1935 |
| 2,392,214 | Cruzan | Jan. 1, 1946 |

FOREIGN PATENTS

| Number | Country | Date |
|---|---|---|
| 6,690 | Great Britain | Mar. 19, 1902 |